(No Model.)  2 Sheets—Sheet 1.
T. B. FOGARTY.
APPARATUS FOR MAKING AMMONIA.
No. 417,779.  Patented Dec. 24, 1889.
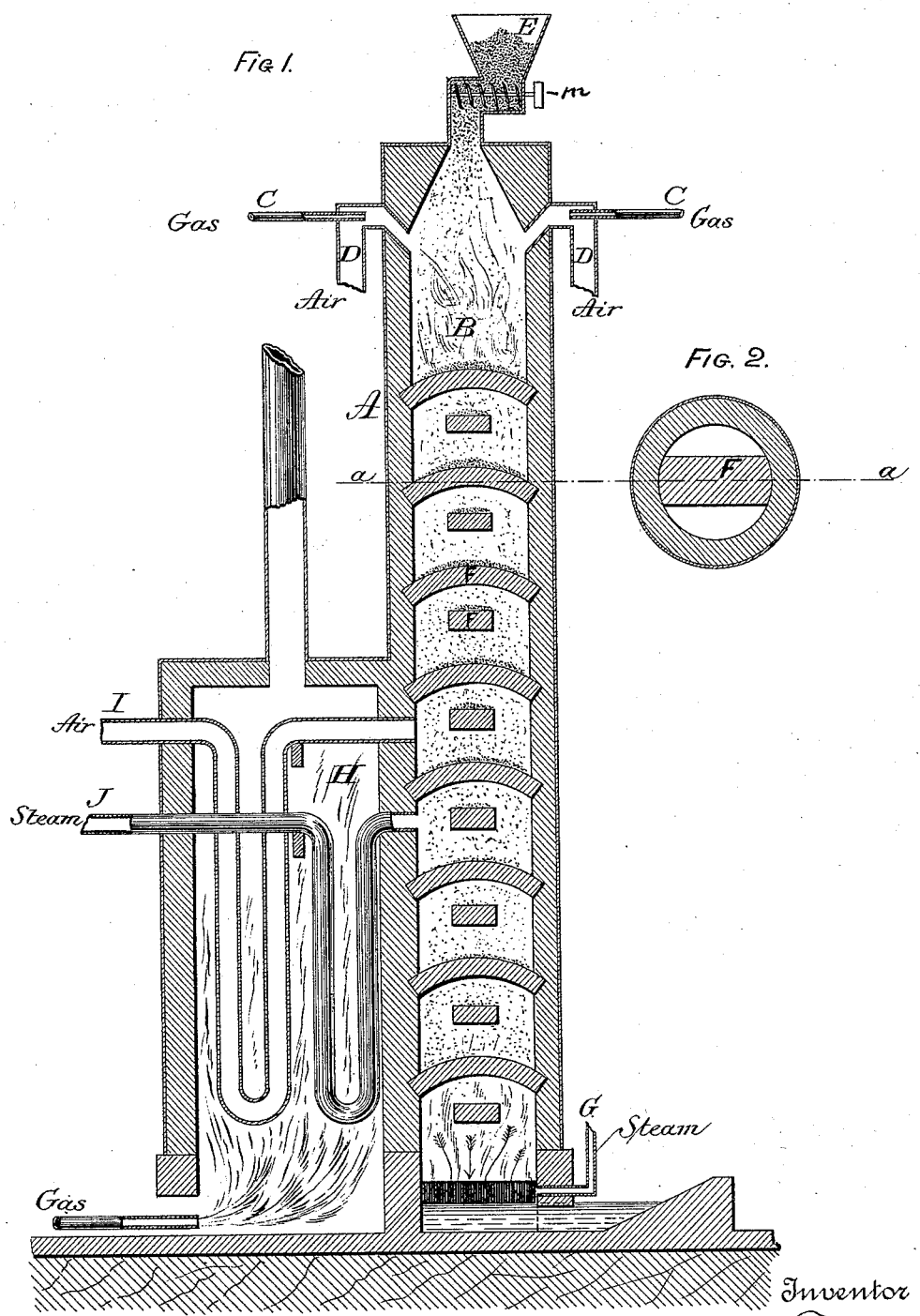

(No Model.) 2 Sheets—Sheet 2.
T. B. FOGARTY.
APPARATUS FOR MAKING AMMONIA.
No. 417,779. Patented Dec. 24, 1889.
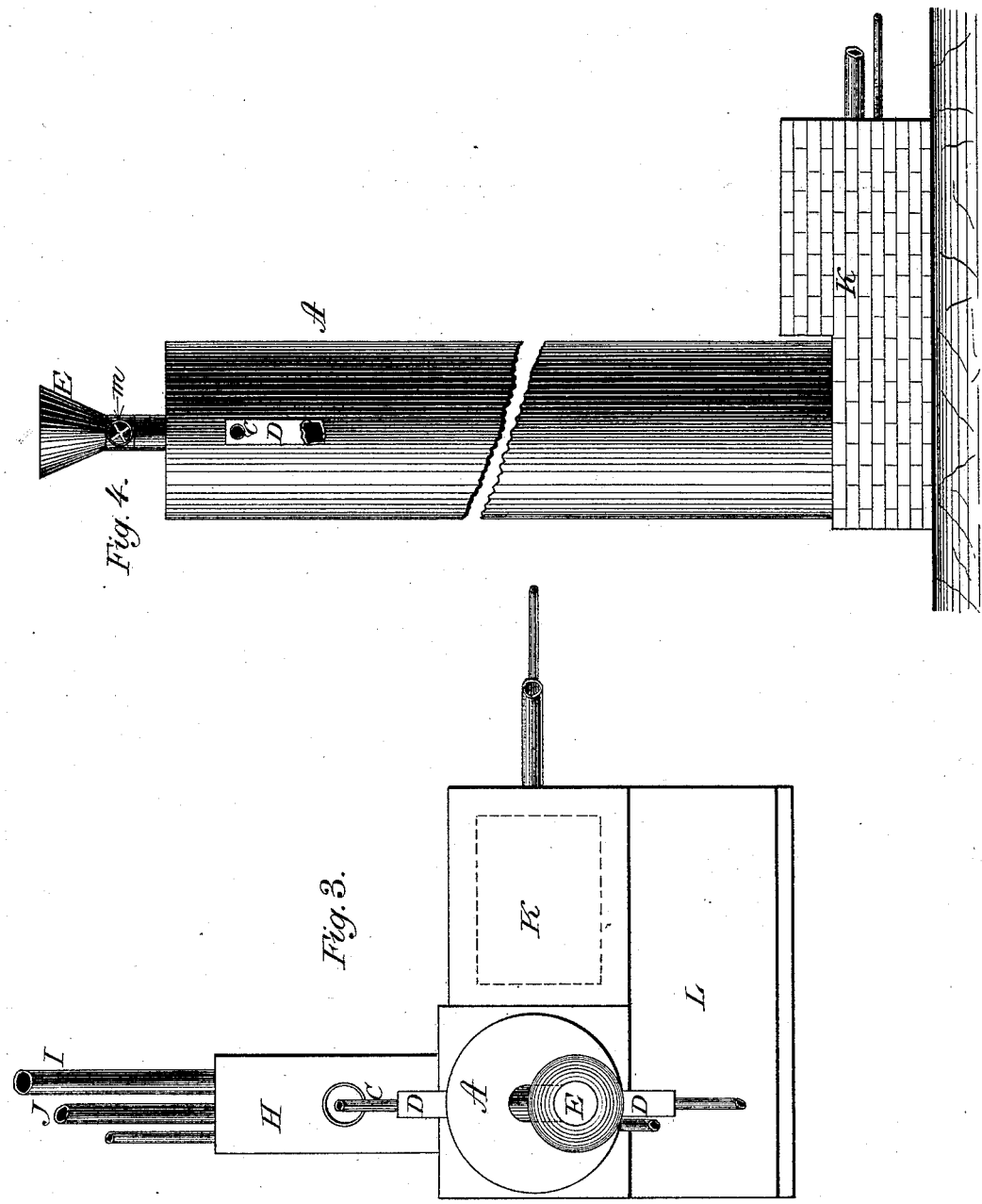

UNITED STATES PATENT OFFICE.

THOMAS B. FOGARTY, OF LONG ISLAND CITY, NEW YORK, ASSIGNOR TO THE AMERICAN AMMONIA MANUFACTURING COMPANY, OF VIRGINIA.

APPARATUS FOR MAKING AMMONIA.

SPECIFICATION forming part of Letters Patent No. 417,779, dated December 24, 1889.

Application filed September 24, 1888. Serial No. 286,231. (No model.)

*To all whom it may concern:*

Be it known that I, THOMAS B. FOGARTY, of Long Island City, county of Queens, and State of New York, have invented a new and useful Apparatus for Manufacturing Ammonia; and I hereby declare the following to be a full, clear, and exact specification of the same, reference being had to the accompanying drawings, forming a part of this specification.

The object of my invention is to obtain ammonia by a simple and economical process from atmospheric nitrogen and the hydrogen of decomposed steam.

It is well understood that ammonia cannot be practically produced upon a large scale by the direct synthesis of its elements; but it is at the same time well known that there is no practical difficulty in the artificial production of cyanogen, and that this having been primarily produced its subsequent conversion into ammonia is an easy matter. It is also well known that it is extremely difficult to effect the combination of isolated nitrogen and carbon—the elements of cyanogen—and to form cyanogen gas even at a high temperature. If, however, an alkali or alkaline earth, or, indeed, any substance capable of combining with cyanogen or of producing a substance capable of combining with it, be present, other conditions being suitable, cyanogen is readily produced from its elements and combines with the alkali or other suitable substance present, to form therewith a cyanide or cyanate, which in turn may be decomposed by steam with the production of ammonia, oxides of carbon, and hydrogen, the combined alkali or equivalent substance becoming separated and entering into fresh combinations.
Taking advantage of this disposition of incandescent nitrogen and carbon to form therewith cyanides and cyanates of such alkali, I inject or feed suitably mixed or adjusted volumes of pulverized carbon and alkali into a close furnace, retort, or chamber, through which I cause them to move or fall and wherein I submit them to the action of a moving volume or current of highly incandescent nitrogenous gas, causing such nitrogenous gas to rise to and maintain at its own high temperature, and by means thereof not only the furnace, retort, or chamber itself, through which the incandescent gas and alkalized carbon are passing or falling, but also the volume of carbon and alkali falling or moving through it, and likewise, by means of the high temperature communicated to them, causing the nitrogen of the gas to combine with the carbon and alkali and to form therewith cyanides, and, if oxygen be present, cyanates of the alkali or its equivalent used. As, however, it is my object to obtain all my cyanogen in the form of cyanates, the nitrogen of which, when they are decomposed by steam, is entirely converted into ammonia, I now introduce into my retort a suitably-adjusted volume of air, preferably superheated, and cause the oxygen of such air to combine with the cyanides therein and convert them into cyanates, which I subsequently decompose by steam with the production of ammonia, oxides of carbon, and alkaline compounds.

The nitrogenous gas used may be derived from any suitable source; but for the purposes of my invention I prefer furnace-gas or the gases of combustion produced by passing or forcing air, either alone or mixed with steam, through a suitable cupola-furnace or retort filled or charged or supplied in a suitable manner with coal or coke or other carbonaceous fuel, either solid, liquid, or gaseous. I use these gases while they are still in a state of intense combustion and incandescence, in the form of the intense flame produced by the active combustion of solid, liquid, or gaseous fuel, for I thus avail myself not only of the nitrogen present as a source of ammonia, but also of the high temperature of the flame itself as a source of heat to produce the necessary reactions.

The ammonia produced may be collected and treated by any of the ordinary processes and apparatus.

I shall now proceed to describe my apparatus so fully and clearly that any person skilled in the art of producing ammonia synthetically may be able to construct and operate it.

To carry out the purposes of my invention, I construct a vertical cupola, furnace, or retort of suitable dimensions and provide it with a suitable furnace to serve the double purpose of heating the retort and of at the same time furnishing nitrogenous gas for the production of ammonia. This furnace may be of any usual form or construction, and may be adapted for the combustion of either solid, liquid, or gaseous fuel. It may be separate from the retort and connected with it by a suitable flue, or it may be built into the retort as an integral part thereof; or, as shown in the drawings, the upper part of the retort itself may be made to do duty as a furnace. In all cases, however, I arrange the furnace or retort so that the incandescent products of combustion—the flame from the furnace—may enter the retort from the top, and, passing downward through it, may heat it internally. I place the outlet of my retort at or near the bottom thereof, and connect to it a dust-collector of ordinary construction for the purpose of removing from the gases escaping from the retort the floating particles of carbonaceous and other matter which would otherwise be carried forward into my condensers and clog them. I cause the flame or volume of incandescent products of combustion to pass downward through the retort by placing the outlet of the latter at or near the ground and connecting to it a chimney of sufficient height or a suitable pump, aspirator, or exhauster, as is commonly done in gas-works.

For the purpose of converting my cyanides into cyanates I suitably connect a suitable air-pipe to my retort, and for the purpose of decomposing the cyanates so produced I suitably connect a steam-pipe at a point below the air-pipe.

In the accompanying drawings, which illustrate and are a part of this specification, the same letters refer to the same parts of the apparatus.

In Figure 1, which is a vertical section of my ammonia-generating furnace or retort, with a supplementary furnace for superheating steam and air attached, A is an ammonia-generating furnace or retort, adapted for the use of gaseous fuel, in which B is the combustion-chamber; C C and D D, pipes for the supply of gas and air, respectively; E, a hopper suitably provided with a feeder $m$; F, shelves or bafflers, and G a steam-pipe. H is a supplementary furnace for superheating steam and air, and contains the air-superheater I and steam-superheater J, both opening into the ammonia-generating furnace A.

Fig. 2 is a cross-section of combustion-chamber B on line $a\,a$.

Fig. 3 is a plan of the apparatus, showing the superheating-furnace H, ammonia-generating furnace A, dust-collector K, (shown in elevation in Fig. 4,) and water-trough L.

Fig. 4 shows a front elevation of the ammonia-generating furnace A and dust-collector K.

The mode of operation is as follows: I admit suitably-adjusted volumes of gas and air through the pipes C and D, respectively, to the ammonia-generating furnace A, and having ignited the gas, by means of a suitable chimney, aspirator, or blower, or combination of such, I suck, pump, force, or draw the ignited gaseous volume or the flame through the ammonia-generating furnace or retort, and thence through a suitable flue or chimney. (Not shown in the drawings.) The incandescent gases are for the present used solely for the purpose of heating the furnace itself, and consequently may be permitted to escape through a chimney or any other convenient outlet; but as soon as I commence to make the ammonia, which I produce from the nitrogen of these gases, they become valuable, and consequently I now conduct them through condensers, scrubbers, and other apparatus suitable for the collection and preservation of the ammonia with which they have become highly charged. It is evident that the interior of A will soon become intensely heated, and that the escaping products of combustion, being extremely rich in nitrogen, and at the same time in a highly-incandescent state, may be made to serve the additional use of furnishing nitrogen for the production of ammonia. Having brought my ammonia-generating furnace or retort to a working-heat, I now start the feeding apparatus $m$ of the hopper E, and by means thereof feed a suitably-adjusted volume of pulverized carbon and alkali into the ammonia-generating furnace A, through which it falls, its fall being retarded by the shelves or bafflers F, and in which the carbon and alkali soon become intensely heated by contact with the volume of highly-incandescent nitrogenous gas—the volume of flame—with which the furnace is filled, and immediately unites with the incandescent nitrogen in the flame to form alkaline cyanides or cyanates, or a mixture of both, according as the volume of incandescent gases contains free oxygen or not or contains it in greater or less volume. I aim to regulate the volume of air admitted to the furnace through the air-pipes D, so that it will be barely sufficient for the combustion of the gas admitted through C, and consequently so that the pulverized carbon will pass unconsumed through the flame, and may be thus available for the production of cyanides by combination with the nitrogen of the gas and the alkali falling through the furnace. In consequence of the limited supply of oxygen the cyanogen compounds produced will be for the most part in the form of cyanides. I now proceed to convert these into cyanates by admitting a supplementary air-supply to A through the air-pipe I, and, while it is not necessary to do so, preferably superheat this air, as I thereby insure a more certain and rapid conversion of the cyanides into cyanates. I now proceed to decompose the cyanates so formed by means of a suitable volume of steam admitted to A through the pipe J, and produce ammonia, oxides of carbon, hydrogen gas, and alkaline compounds.

While it is not really necessary to do so, I find it advantageous to superheat the steam admitted through A, as I thereby prevent, at least to a great extent, the cooling of A, and at the same time largely promote the rapid decomposition of the cyanates, and consequently produce a copious formation of ammonia. I am careful to admit the air into A through the pipe I at such a point that the oxygen of the air admitted through I shall have sufficient time to act upon the cyanides present and to insure their conversion into cyanates before they are subjected to the action of the steam admitted through J. In the plan of furnace shown in the drawings I effect this by introducing my supplementary air-supply into A at a point much higher than that at which I introduce the steam, and consequently so as to give the contained oxygen time to reach and combine with the cyanides before the latter come under the influence of the steam introduced through J, or have a chance of being decomposed by it. From the ammonia-generating furnace A the gaseous products, mixed with suspended pulverulent matter, pass into a dust-collector $k$, of any ordinary construction, and at the inlet thereof meet with a volume of steam introduced through the pipe G, and are thereby cooled and caused to deposit the pulverulent matter which they hold in suspension. From the dust-collector the gases pass through a series of condensers, scrubbers, and other apparatus of ordinary construction, and have the contained ammoniacal gases and salts absorbed by water and collected as ordinary ammoniacal liquor, which may now be treated and reduced to a commercial form by any of the usual processes.

Be it known that I do not bind or confine myself to the precise form, construction, or arrangement of the apparatus described, for it must be evident that these may be varied indefinitely.

I am aware that in an application for a patent filed by me August 22, 1888, I have described a process of manufacturing ammonia, and disclaim the same in this application.

I am aware that apparatus including cupola or stack furnaces have been proposed for the manufacture of ammonia or its compounds, and furnaces for such purposes are not, broadly, of my invention.

What I claim, and desire to secure by Letters Patent, is—

1. The combination of the ammonia-generating furnace A, having its combustion-chamber B placed at its upper part and provided with gas-inlet C, air-inlet D, and a hopper for supplying solids, with the superheater H, and the steam-pipe passing through said superheater and communicating with the furnace below its combustion-chabmer, substantially as described.

2. In an ammonia-generating furnace or retort A, the supplementary air-pipe I, suitably placed between the combustion-chamber B and steam-pipe J, and constructed and operated substantially as described.

3. In an apparatus for producing ammonia, the combination of the hopper E and feeder $m$, with the combustion-chamber or furnace B placed in the upper part of the ammonia-generating retort A, and the steam and air pipes J and I, when constructed and operated substantially as described.

4. In an apparatus for producing ammonia, the combination of the ammonia-generating retort A, suitably provided with a furnace or combustion-chamber at its top or upper part, and with the bafflers or shelves F, with the steam and air pipes I, J, and G, constructed and operated substantially as described.

In testimony whereof I have signed my name to this specification before two subscribing witnesses.

THOS. B. FOGARTY.

Witnesses:
 OTTO F. STRUSE,
 LEO VON ROSENBERG.